EXACT DEPENDENCE OF n UPON $(E_F - E_c)$ AND T COMPARED TO LIMITING FORMS.

United States Patent Office 3,222,599
Patented Dec. 7, 1965

3,222,599
DIFFERENTIAL AMPLIFIER METERING CIRCUIT WITH TEMPERATURE COMPENSATION
Stanley Gewirtz, New York, N.Y., assignor to Solid State Systems, Inc., New York, N.Y.
Filed Jan. 17, 1961, Ser. No. 83,307
5 Claims. (Cl. 324—123)

This invention relates to a means and method of increasing the sensitivity and impedance of a meter while maintaining a high degree of linearity, accuracy and stability. More particularly, it relates to a method of attaining these results by means of a special differential amplifier containing a unique temperature neutralizing system.

Specifically, the invention involves the use of a two-transistor amplifier circuit having a temperature neutralizing system for the purpose of increasing the sensitivity and impedance of a current meter while maintaining its linearity, accuracy and stability.

The object of the invention is to provide a circuit adapted for use in transistor voltmeters and other meters, instruments and controls requiring amplification and a high degree of linearity, accuracy and stability. By virtue of its parameters, this circuit is adaptable to any pair of moderate gain, small signal transistors, and will work equally well with N-P-N and P-N-P transistors of any method of manufacture. Illustrative are N-P-N transistors of the 2N169 type. By reversing battery and meter polarities, P-N-P transistors may be used to the same advantage.

One of the features of the circuit is its economy of manufacture, based on the use of low cost components and simple assembly procedures. Another feature is its economical use of power. Typical maximum power consumption is approximately two milliwatts at full meter deflection. This renders the circuit uniquely portable by presenting accurate and stable service from a portable power source far longer than present circuits designed for similar purposes.

The use of transistors and other long-lived components makes any application of this circuit free from maintenance or replacement problems associated with other means of amplification. Its sensitivity and input impedance are as high or low as design parameters cause it to be. With the values contained in the circuit as illustrated herein it requires approximately one micro-watt for full scale deflection of a 50 micro-ampere, one-volt meter movement.

The temperature neutralizing system neutralizes the effects of the thermally generated forbidden gap voltage and enables the circuit to have a ground-to-input voltage of an almost perfect zero. This allows the circuit to measure even the smallest input voltages with the highest linearity and accuracy. Because of inherent high stability, several of these circuits can be connected in series for greater input impedance and sensitivity, while enabling the designer to use less sensitive current meters. The fact that the circuit is also a differential amplifier affords it even greater independence from temperature and voltage changes.

The invention is illustrated in the accompanying drawing, in which.

*Description*

Figure 1:
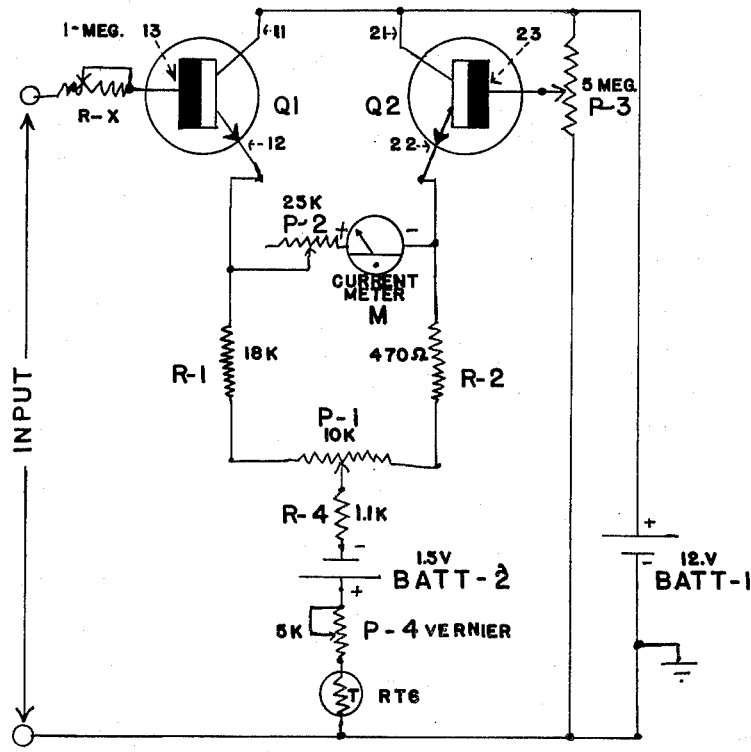
FIG. 1 is a circuit diagram of a transistor voltmeter embodying the principles of the invention.

The circuit consists of a transistor Q1 having a collector 11, emitter 12 and base 13, a second transistor Q2 having a collector 21, emitter 22 and base 23, a double voltage supply illustrated as two batteries or dry cells Batt–1 and Batt–2, three potentiometers P1, P2 and P3, a variable resistor P4, three resistors, R1, R2 and R4, and a current meter M.

Both transistors are in the emitter-follower grounded-collector configuration, and are connected together to make a modified differential amplifier. As is well known, the differential amplifier, due to its high common mode rejection, is little affected by temperature and power supply voltage changes. The emitter-follower configuration generates a high input impedance and further enhances the circuit's freedom from voltage and temperature changes.

Battery Batt–1 is shown as a 12-volt battery, and is used to supply the collector voltage as well as the main source of power for the circuit. Battery Batt–2 has a voltage of about 1.5 and is mainly used to balance out the input transistor's thermally generated base voltage. This enables the circuit to measure even the smallest voltages with great accuracy and linearity.

Potentiometer P1 is used as a zero adjustment for the meter M. Its movable arm represents a summing junction for the differential amplifier, and it sums the currents from the emitters of transistors Q1 and Q2. Resistors R1 and R2 are merely extensions of potentiometer P1 for the purpose of increasing the resolution of the zero adjustment.

Potentiometer P2 is used as a variable resistor voltage divider for adjusting the voltage sensitvity of the current meter M in measuring the difference in voltage between the emitters of Q1 and Q2, and it serves as a sensitivtiy calibrator of the circuit sensitivity.

Potentiometer P3 is a high impedance voltage divider, and is used to provide a reference voltage to the base of transistor Q2. Since emitter followers have a voltage gain of unity, transistor Q2 generates this reference voltage at its emitter regardless of the current generated by the emitter of transistor Q1. This feature is very important in eliminating the effects of the high emitter-current/gain characteristics of small signal transistors. This makes the difference in voltage between the emitters of transistors Q1 and Q2 infinitely dependent on the input voltage, rather than the input current or gain characteristics of the transistors. This, of course, enables the circuit to be used as an accurate voltmeter.

Variable resistor P4 and RT6 make up the voltage divider used in the tracking of the input base's thermally generated voltage. RT6 may be a negative coefficient device, in which case automatic tracking occurs and variable resistor P4 is used only for minor vernier adjustments.

Resistor R4 is a common summing junction voltage divider and is used to further increase and stabilize the input impedance and common mode rejection. It also appears in series with variable resistor P4 and RT6 as a fixed voltage divider.

Rheostat R–X is optional and may be used to exactly calibrate the input impedance for use of this circuit in a precision multiple range instrument. In actual practice the rheostat was used to exactly match the resistor divider networks in a ½% accurate multi-function production laboratory instrument.

*Operation*

With zero adjustment potentiometer P1 adjusted so that its arm is at approximate center of rotation, voltage divider reference potentiometer P3 is adjusted so that meter deflection is zero (no deflection). This means that the arm of potentiometer P3 is presenting the emitter voltage of transistor Q1. Since emitter followers have voltage gains of approximate unity, the output voltage of transistor Q2 at its emitter, is equal to its base voltage regardless of the current generated by the emitter of transistor Q1. With specified circuit values this would hold true up to a maximum current output on the part of transistor Q1 of 170 micro-amperes.

By its differential connection, any common thermal or voltage generated increase or decrease in the emitter current of transistor Q1 is neutralized by a similar change in emitter current on the part of transistor Q2. Hence there is freedom from common mode rejection.

Figure 2:
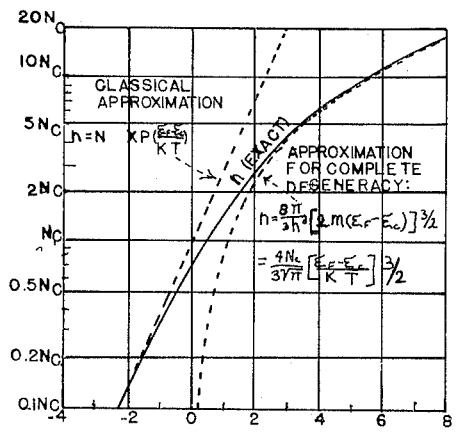
FIG. 2 is a graph showing the thermal generation of electron density in the conduction band of a semi-conductor.

The result is a stable high impedance current amplifier that is conservatively rated as having a current gain of 50. The problem that remains, however, is that all transistors are made of semi-conductor material, and the concentration of electrons moving from the valence band into the conduction band in a semi-conductor is temperature dependent. The thermal generation of electron density in the conduction band is displayed in FIG. 2, which is a graph from Shockley's "Electrons and Holes in Semiconductors," Van Nostrand, 1950, page 242. The graph was derived from the Fermi-Dirac Statistics for semi-conductors and contains both theoretical and exact curves. It shows the effect of temperature on semi-conductors and the exact dependence of $n$ upon $(Ef-Ec)+T$ compared to limiting forms. The abbreviations used in the graph signify the following:

$n$—electron density
$m$—mass
$Nc$—effective density of states in conduction band
$Ef$—forbidden gap voltage
$Ec$—conduction band voltage
$T$—absolute temperature
$h$—Planck constant
$K$—Boltzmann constant When an electron leaves the valence band and enters the conduction band it leaves behind it a hole, and therefore completes the requirement for conductance (the reciprocal of resistance). One of the consequences of this effect is that the base of a transistor always possesses a voltage which is greater than zero. In germanium at 25° C. it is approximately .6–.7 volt. This voltage progressively rises with increases in temperature. As was previously illustrated, the resultant effect of this phenomenon is neutralized by the base reference voltage at transistor Q2 and the differential amplifier connection. So no zero shift occurs in the meter circuit.

However, when measuring circuits containing voltages below this thermally generated base input voltage, current would flow from the base of transistor Q1 into the test circuit, instead of the reversing occurring. To solve this problem a tracking ground potential is provided. This ground potential is slightly positive with respect to the emitter voltage supply, and acts with battery BATT-2, and variable resistor P4 and RT6 to duplicate the changes of voltages that are thermally generated at the base of transistor Q1 or input transistor. The result is that the ground input and the base input are both always at the exact same potential, which is thermally generated at the base of transistor Q1, and hence no current flows. Inasmuch as the difference in voltage between base input, and ground input is equal to zero, the circuit has infinite acceptance for even the smallest input voltages. The circuit can therefore measure even the smallest voltages above zero accurately and linearly.

Since there are some circuits in current use which are claimed to be temperature compensated, the differences between the present state of the art compensation technique results and the results of the temperature effect neutralization invention herein described will now be discussed.

Most present day techniques can be summarized as either having a thermistor shunt from base to ground, a positive temperature coefficient resistor in series with the base and then a resistor shunt to ground, or a positive temperature resistor in the positive feedback loop. Their effect is temperature compensation of gain (which is accomplished even to a greater extent by the differential configuration herein claimed) and can be considered satisfactory for audio amplifiers and logarithmic D.C. amplifiers, where threshold linearity and high impedance stability are not as important as high gain, as provided by a multiplicity of stages. This technique does not, however, prove satisfactory where low level high impedance D.C. sources, requiring high linearity and accuracy in their measurement, are concerned.

I claim:

1. A metering circuit for measuring a voltage applied across two input terminals of said circuit, comprising
   (a) a current responsive meter having two meter terminals;
   (b) a first transistor having a base, emitter and collector;
   (c) a second transistor having a base, emitter and collector;
   (d) a first potentiometer including:
      (1) a first resistor connected at opposite ends to respective opposite terminals of said meter, and
      (2) a movable tapping arm electrically connected to ground and to one of said input terminals, said first potentiometer serving to adjust the meter to zero reading;
   (e) a direct current source having one terminal connected to ground and another terminal connected to the collectors of the transistors; and
   (f) a second potentiometer including a second resistor connected at opposite ends to ground and to the collectors of the transistors, said second potentiometer having a movable tapping arm connected to the base of the second transistor, the said second potentiometer providing a reference voltage from the first transistor to the base of the second transistor;
   (g) the emitters of said first and second transistors being connected respectively to opposite terminals of the meter, the emitters of said first and second transistors also being connected to opposite ends of the first resistor by means of first and second emitter resistors, respectively, the ratio of resistance of said first emitter resistor to said second emitter resistor being 10 or greater, the base of the first transistor being connected to the other one of said input terminals, said two transistors constituting an asymmetrical differential amplifier circuit whereby any change in emitter current of the first transistor caused by power supply voltage variations is neutralized by a similar change in emitter current of the second transistor;
   (h) a second direct current source; and
   (i) variable resistance means including a resistor element having a negative coefficient of resistance connected in series with said second direct current source between the movable tapping arm of the first potentiometer and ground, said variable resistance means and said second direct current source producing a voltage having a polarity opposite to that of the thermally generated E.M.F. in said first transistor to track and balance out said thermally generated E.M.F. in the first transistor, whereby sensitivity and impedance of the meter is increased while linearity, accuracy and stability of the meter are maintained.

2. A metering circuit according to claim 1, further comprising a third potentiometer including a variable resistor connected at opposite ends to the emitter of the first transistor and to one terminal of said meter respectively for adjusting voltage sensitivity of the meter.

3. A metering circuit according to claim 1, further comprising a rheostat having a variable resistance connected between the other one of said input terminals and the base of the first transistor for precisely adjusting input impedance of the metering circuit.

4. A metering circuit according to claim 2, further comprising a rheostat having a variable resistance connected between the other one of said input terminals and the base of the first transistor for precisely adjusting input impedance of the metering circuit.

5. A metering circuit according to claim 1, further comprising another variable resistor in series with said second direct current source and said negative coefficient resistor element to cooperate with said resistor element in tracking and balancing out the thermally generated E.M.F. in the first transistor.

References Cited by the Examiner

UNITED STATES PATENTS

| | | | |
|---|---|---|---|
| 2,887,540 | 5/1959 | Aronson | 330—23 |
| 2,903,524 | 9/1959 | Howell | 330—69 |
| 3,063,010 | 11/1962 | Richardson | 324—62 X |

FOREIGN PATENTS 800,506   8/1958   Great Britain.

OTHER REFERENCES

Slaughter: IRE Transactions-Circuit Theory, March 1956, pages 51–53.

WALTER L. CARLSON, *Primary Examiner.*

FREDERICK M. STRADER, NATHAN KAUFMAN, RUDOLPH V. ROLINEC, *Examiners.*